US012207055B2

(12) United States Patent
Kristensen

(10) Patent No.: US 12,207,055 B2
(45) Date of Patent: Jan. 21, 2025

(54) HEARING AID AND A METHOD FOR ENHANCING AND/OR PROTECTING A USER'S HEARING ABILITY

(71) Applicant: Oticon Medical A/S, Smørum (DK)

(72) Inventor: Rasmus Simling Kristensen, Smørum (DK)

(73) Assignee: Oticon Medical A/S, Smørum (DK)

( * ) Notice: Subject to any disclaimer, the term of this patent is extended or adjusted under 35 U.S.C. 154(b) by 694 days.

(21) Appl. No.: 17/397,143

(22) Filed: Aug. 9, 2021

(65) Prior Publication Data

US 2022/0046369 A1 Feb. 10, 2022

(30) Foreign Application Priority Data

Aug. 10, 2020 (EP) .................................... 20190331
Aug. 17, 2020 (EP) .................................... 20191300

(51) Int. Cl.
*H04R 25/00* (2006.01)

(52) U.S. Cl.
CPC ......... *H04R 25/606* (2013.01); *H04R 25/554* (2013.01); *H04R 25/407* (2013.01); *H04R 25/505* (2013.01); *H04R 2225/67* (2013.01)

(58) Field of Classification Search
None
See application file for complete search history.

(56) References Cited

U.S. PATENT DOCUMENTS 9,596,551 B2 * 3/2017 Pedersen ................ H04R 1/406
2018/0352343 A1 12/2018 Recker et al.
2020/0077204 A1 3/2020 Pedersen et al.
2020/0084556 A1 3/2020 Haagerup et al.

* cited by examiner

*Primary Examiner* — Paul W Huber
(74) *Attorney, Agent, or Firm* — Birch, Stewart, Kolasch & Birch, LLP

(57) ABSTRACT

A hearing for enhancing and/or protecting a user's hearing ability when receiving acoustic signals from the user's environment, wherein the hearing aid is arranged to be magnetically or mechanically attached to a fixture implanted in the skull bone or as a fully or partially implanted device is disclosed. Also a method for enhancing and/or protecting a user's hearing ability when receiving acoustic signals from the user's environment performed by at least one hearing aid is disclosed.

20 Claims, 5 Drawing Sheets

HEARING AID AND A METHOD FOR ENHANCING AND/OR PROTECTING A USER'S HEARING ABILITY

FIELD

The present disclosure generally relates to hearing aids and methods for enhancing and/or protecting a user's hearing ability when receiving acoustic signals from the user's environment. More particularly the present disclosure relates to a hearing aid being arranged to be magnetically or mechanically attached to a fixture implanted in the skull bone or as a fully or partially implanted device comprising: an input unit for generating audio signals corresponding to the acoustic signals from the user's environment, wherein the input unit comprises at least three microphones, in particular three to six microphones, a signal processing unit for modifying the generated audio signals and an output unit to provide modified audio signals as audible signals to at least one of the user's ears.

BACKGROUND

In the field of hearing aid devices there is an increasing desire towards individual adaptation of hearing aid settings in order to provide users with an optimal sound experience. Hearing aid producers aim for providing hearing aid devices that are capable of learning the user's individual preferences so that the hearing aid devices can deliver a just-right sound amplification.

Such optimization may be carried out by fitting the hearing aid device on the basis of a number of individual parameters, however, some parameters are difficult to access and quantify.

The capability of a directional system of a hearing aid is dependent on the time difference between signals arriving from the front and from the rear of a user wearing the hearing aid to separate the sounds from the different directions. Therefore, known hearing aids usually comprise an input unit having two microphones which are typically arranged in the direction a spatial resolution of the acoustic signals from the user's environment is desired, e.g. on a front side and on a rear side of the hearing aid. Usually, the acoustic signals from the front side of a user are emphasized by a beamforming algorithm of a signal processing unit in order to enhance the spatial resolution for a user.

For hearing aids that are arranged to be magnetically or mechanically attached to a fixture implanted in the skull such as bone anchored hearing aids or to be fully or partially implanted such as bone conduction hearing aids or of the ear cochlear implant (CI) system, the orientation of the hearing aid is not clearly defined by the design due to the rotational symmetry of the fixation method of said systems. The part of the hearing aid comprising the microphones may be fixated in any rotational position around the axis of fixation. Therefore, the exact position of the microphones during use of the hearing aid is not known.

If the part of the hearing aid comprising the microphones for example is rotated by a user by 90° relative to the usual position defined by the manufacturer of the hearing aid, the direction for the spatial resolution or the spatial direction of the hearing aid is changed and the beamforming algorithm does no longer emphasize the acoustic signals from the front of the user, but instead enhances the acoustic signals above or below a user which is not desired.

Any rotational fixation of the part of the hearing aid comprising the two microphones different from the recommended rotational fixation according to the manufacturer will thus decrease the performance of the spatial resolution of the hearing aid in a smaller or larger degree. A rotation of the part of the hearing aid comprising the two microphones may be caused by an incorrected fixation of said part of the hearing aid or by a movement of said part of the hearing aid caused by the movement of the user.

Therefore, there is a need to provide a solution that allows for a reliable and desired spatial resolution for the user of a hearing aid.

SUMMARY

According to a first aspect a hearing aid for enhancing and/or protecting a user's hearing ability when receiving acoustic signals from the user's environment is provided, wherein the hearing aid is arranged to be magnetically or mechanically attached to a fixture implanted in the skull bone or as a fully or partially implanted device. The hearing aid may for example be a bone conduction hearing aids, an off the ear cochlear implant (CI) system or a bone anchored hearing aid. The hearing aid may comprise an input unit for generating audio signals corresponding to the acoustic signals from the user's environment. The input unit may comprise at least three microphones, in particular three to six microphones. The microphones are configured to record acoustic signals from the user's environment. The hearing aid may further comprise a signal processing unit for modifying the generated audio signals by the input unit. Hereby, the signal processing unit may modify the audio signals by using an algorithm, in particular a beamforming algorithm, in order to enable a spatial resolution for the user of the hearing aid. The hearing aid may further comprise a fixture interface configured to magnetically or mechanically attach to the fixture implanted in the skull bone. The hearing aid may further comprise an output unit to provide modified audio signals as audible signals to at least one of the user's ears, at least one sensor element for detecting the position of the hearing aid and a control unit for selecting the audio signals of at least two microphones and for transferring the selected audio signals to the signal processing unit, wherein the audio signals are selected depending on the position of the hearing aid. By providing at least one sensor element for detecting the position of the hearing aid, the control unit may select at least two microphones which enable a sufficient spatial resolution for the user of the hearing aid. Only the input of the selected microphones is transmitted to the signal processing unit and is further processed.

According to a second aspect, a method for enhancing and/or protecting a user's hearing ability when receiving acoustic signals from the user's environment performed by at least one hearing aid, in particular a hearing aid according to the first aspect is provided. The method may comprise: providing a hearing aid, wherein the hearing aid is arranged to be magnetically or mechanically attached to a fixture implanted in the skull bone or as a fully or partially implanted device. The hearing aid may for example be a bone conduction hearing aid, an off the ear cochlear implant (CI) system or a bone anchored hearing aid. The method may further comprise: generating audio signals corresponding to the acoustic signals from the user's environment by an input unit, wherein the input unit comprises at least three microphones, in particular three to six microphones; modifying the generated audio signals by a signal processing unit; providing the modified audio signals as audible signals to at least one of the user's ears by an output unit; detecting the position of the hearing aid by at least one sensor element;

selecting the audio signals of at least two microphones depending on the position of the hearing aid by a control unit; and transferring the selected audio signals to the processing unit. By providing at least one sensor element for detecting the position of the hearing aid, the control unit may select at least two microphones, in particular exactly two microphones, which enable a sufficient spatial resolution for the user of the hearing aid. Only the input of the selected microphones is transmitted to the signal processing unit and is further processed.

By having a sensor that is able to determine the direction of orientation of the at least three microphones will be of an advantage when assisting the recipient of the hearing aid in arranging the microphones in the correct direction. The signal processing is configured to do processing according to a preferred orientation of the microphones, and that preferred orientation may be determined by the at least one sensor.

In another example, the signal processing may not be able to configure the processing to different orientations of the microphones, it is therefore a need to have the orientation of the at least three microphones determined in according to the fixture interface.

The control unit is configured to transmit an alert signal to the output unit based on the detected orientation. For example, if the detected orientation is not within a preferred orientation then an alert signal is being transmitted to the output unit which then forward an audible sound to the recipient of the hearing aid indicating that the hearing aid is oriented wrongly.

The at least one sensor element may be configured to transmit the orientation to an external communication device that is communicative to the hearing aid via a wireless communication link, such as WIFI, any Bluetooth protocol, inductively or any kind of a sort range wireless communication link.

The external communication device may be a smartphone that includes an application that is configured to indicate to the recipient of the hearing aid, that the hearing aid is oriented wrongly. In yet another example, the application is configured to guide the recipient for the purpose of orienting the hearing aid correctly.

The determined orientation may be a determined orientation of each of the microphones in relation to the fixture interface, and that orientation is indicated by an angle of each microphones in relation to the fixation fixture. A preferred orientation is a predetermined angle range of each microphones for which each of the angle of each of the microphones has to be within.

The determined orientation may be a determined orientation based on a triangle arrangement of the microphones, and where an angle of a certain point on the hearing aid is determined in relation to the fixture interface based on the triangle arrangement of the microphones and trigonometry.

According to a third aspect, a hearing aid for enhancing and/or protecting a user's hearing ability when receiving acoustic signals from the user's environment is provided. The hearing aid may be arranged to be magnetically or mechanically attached to a fixture implanted in the skull bone or as a fully or partially implanted device comprising: an input unit for generating audio signals corresponding to the acoustic signals from the user's environment, wherein the input unit comprises at least two microphones, a signal processing unit for modifying the generated audio signals, an output unit to provide modified audio signals as audible signals to at least one of the user's ears, wherein the hearing aid is arranged in a such a way that the hearing aid is attached or implanted in a defined and fixated position. By arranging the hearing aid or at least the part of the hearing aid which comprises at least two microphones in a defined and fixated position, the at least two microphones may be arranged in a beneficial position. For example one hearing aid microphone may be directed into a front direction of the user and one hearing aid microphone may be directed in a rear direction of the user. Thus, the signal processing unit knows the exact position of the microphones and may thus enhance the audible signal from the hearing aid microphone directed to the front of a user and weaken the audible signal from the hearing aid microphone directed to the rear side of the user by using a beamforming algorithm.

The hearing aid may comprise at least one sensor element that is configured to detect the rotational position of the hearing aid. By detecting the rotational position of the hearing aid, the control unit may select the input of microphones which are beneficial for the spatial resolution. Additionally, the signal processing unit may take the rotational position of the input of the selected microphones into account and may therefore further improve the hearing experience of the user.

The hearing aid may comprise a sensor element, wherein the sensor element detects the position of the hearing aid by measuring the movement, the acceleration and/or the orientation of the hearing aid. This allows for an improved hearing experience for the user of the hearing aid since the microphones may be selected which deliver the most realistic input regarding the desired spatial distribution or resolution. Additionally, the signal processing unit may take the position of the input of the selected microphones into account and may therefore further improve the hearing experience of the user.

The sensor element of the hearing aid may be an accelerometer, a gyroscope or a compass. The sensor element may comprise a positioning system (e.g. a receiver of a satellite positioning system, e.g. a GPS receiver). Hereby, it is possible to use robust and reliable standard components to detect the desired positional data of the hearing aid.

The accelerometer may be an accelerometer configured to measure linear acceleration in one, two or three directions, whereas the gyroscope may be a gyroscope configured to measure angular velocity in one, two or three directions. A compass preferably indicates a direction in a horizontal plane at a particular place on the surface of the earth, e.g. in a North, West, South, East framework.

It may be an advantage that the hearing aid device contains both an accelerometer and a gyroscope so that both linear and rotational movement of the head of the user or of the hearing aid may be determined with high precision and accuracy. The hearing aid (or a device in communication with the hearing aid) may additionally comprise a positioning system and/or a compass.

Both accelerometers and gyroscopes may be designed with specific x, y and z axis relative to the hearing aid and/or a housing of the hearing aid. Integrating the at least one sensor element into a hearing aid may be performed by matching the axis of orientations of the at least one sensor directly with the axis of orientation of the hearing aid (e.g. an axis defined by a horizontal plane and/or the direction of spatial distribution or resolution) when they are placed on a user's ears. In this way no conversion of the accelerometer data is needed to achieve correct movement data (i.e. moving forward may e.g. correspond directly to the positive direction of the accelerometers x-axis). Alternatively, a fixed transformation of the data can be carried out by use of fixed spatial rotation of the axis, based on previous calculated placement of the sensors in the user situation relative to a characteristic direction of the hearing aid (e.g. a direction defined by the housing of the hearing aid. e.g. an outer edge of the housing). But to allow user individualization as well as allowing for free orientation of the sensors, it is advantageous to detect the sensors placement relative to the head of the user by detecting movement data for each hearing aid and to compare such data between the hearing aids. A spatial rotation matrix may be determined from the combined data, and this can be used for spatial transformation of the sensors' axis to the users current head orientation. The transformation should preferably be continuously adapting to the user's head movements.

The signal processing unit may be configured to compensate for a possible dislocation of the selected microphones by modifying the audio signals on the basis of measurements made by the at least one sensor element. Hereby, the hearing aid may provide an improved sound experience for the hearing aid user due to the fact that the hearing aid may compensate a dislocation of the microphones. A dislocation of the microphones may occur when the microphones are not arranged in the same horizontal plane.

In the present context, a 'vertical direction' is taken to coincide with a direction of the gravitational force on a body at a given location. Similarly, a 'horizontal plane' is taken to be perpendicular to the vertical direction (and thus to a direction of the gravitational force on a body) at the given location.

The control unit of the hearing aid may select the input of two microphones. Preferably, the control unit selects the two microphones depending on the axis of spatial distribution, e.g. the connection line between the two microphones. The axis of spatial distribution of two microphones is defined as a line which connect the two microphones. If the hearing aid comprises at least three microphones, the control unit may first asses the position of each of the microphones via the data generated by the at least one sensor element. Afterwards, the control unit may compare the axes of spatial distribution of the microphones to each other. Preferably, the control unit selects the two microphones which axis of spatial distribution corresponds the most to a substantially horizontal plane and/or which axis of spatial distribution corresponds the most to the direction of a desired spatial distribution or resolution of the user. Usually, the control unit may select the two microphones which axis of spatial distribution corresponds the most to a substantially horizontal plane. Hereby, two microphones may be chosen which enable a desired differentiation between acoustic signals from the front and back of the user.

The control unit may select the input of two microphones depending on the axes of spatial distribution between the microphones, wherein two microphones are selected with regard to which axis of spatial distribution corresponds the most to a substantially horizontal plane and/or to a direction of desired spatial distribution or resolution of a user. Hereby, two microphones may be chosen which enable a desired differentiation between acoustic signals from the front and back of a user. The horizontal plane preferably is substantially perpendicular to the vertical direction (and thus to a direction of the gravitational force on a body of the user of the hearing aid). The horizontal plane thus preferably extends in an upright position of the user orthogonal to the longitudinal extension of a user.

The control unit may additionally select the two microphones depending on the position of the two microphones on the head of the user. Hereby, if a plurality of axes of spatial distribution between the microphones, in particular between at least four microphones, substantially correspond to a horizontal plane and/or to a direction of desired spatial resolution of a user, additional aspects may be taken into account when selecting the two microphones. These additional aspect may for example comprise shadowing effects from the pinna.

The hearing aid may be arranged to be magnetically attached to a fixture implanted in the skull and wherein the fixture comprises at least two magnets in order to attach the hearing aid in a defined and fixated position. By attaching the hearing aid in a defined position, a preferred position of the at least two microphones may be guaranteed. Hereby, a beneficial hearing experience for the user may be provided since the microphones may be arranged on a substantially horizontal plane. Thus, the spatial distribution or resolution of the acoustic signals from the user's environment may be sufficiently reproduced by the audible signals provided to the at least one of the user's ears.

The hearing aid may be arranged to be mechanically attached to a fixture implanted in the skull, wherein the fixture comprises a coupling and wherein the coupling comprises a keying feature in order to attach the hearing aid in a defined position. By attaching the hearing aid in a defined position, a preferred position of the at least two microphones may be guaranteed. Hereby, a beneficial hearing experience for the user may be provided since the microphones may be arranged on a substantially horizontal plane. Thus, the spatial distribution of the acoustic signals from the user's environment may be sufficiently reproduced by the audible signals provided to the at least one of the user's ears.

The at least one sensor element may be arranged at a predetermined point in the hearing aid that makes it possible to determine an orientation angle of each of the microphones and the hearing aid.

The output unit may include a vibrator that is configured to provide mechanical or electrical vibrations to the skull of the user/recipient. The mechanical vibration may be provided by a mechanical based vibrator and the electrical vibration may be provided by a piezo based vibrator.

The vibrator may include a counterweight and/or an actuator where the at least one sensor element may be arranged onto allowing one mean to measure a force transferred to the skull by the vibrator or the fixture interface.

A processing unit of the hearing aid may be configured to convert the measured force or acceleration and correlating this value with a known power entered to the vibrator for providing the force, and that will give an estimate of an impedance of the skull of the recipient. The estimated impedance of the skull may be used to adjust an impedance of the vibrator providing a more power efficient transfer to the skull of the recipient.

In a binaural or a bimodal hearing aid system including two hearing aids worn on each ear, it will be beneficial to exploit the at least one sensor element of each hearing aid in combination with a gyroscope and/or an accelerometer of an external device for estimating a position of a sound source relative to a position of the user's head. The external device may be a smartphone.

The user may point the external device in a direction towards the sound source or identifying the sound source via a graphical user interface that includes a virtual map including an indicator of a position of the sound source in relation to the external device. The sound source may then be spatialized relative to the external device 70 by the external device based on information provided by the gyroscope and/or accelerometer. The two hearing aids are then configured to determine based on the information provided by the at least one sensor unit element from each hearing aids and information including the spatialization of the sound source relative to the external device a virtual position of the sound source in relation to a position of the head of the recipient. As the user is moving around with the external device, the external device is configured to optimize the spatialization of the sound source in relation to the position of the user's head, and thereby, optimizing spatial cues of the audible signal provided to the recipient via the output unit. The optimization is either provided by the external device or by both hearing aids. The sound source may be a speaker providing an acoustical sound, or the sound source may be a streamer configured to provide an acoustical sound via a wireless communication link.

The hearing aid may include a vibrator, and the at least one sensor element may be arranged within the hearing aid and configured to determine a mechanical vibration feedback. In this example the at least one sensor element may include an accelerometer. The mechanical vibration feedback may include the vibrational output power. That way, it would be possible to do following:

- fine tune the performance of a processor during a fitting session or use of a hearing aid that includes a vibrator,
- support acoustical and mechanical compensations during normal use of the hearing aid,
- inform the user in real-time about incorrect coupling of the hearing aid to an abutment applied to a skull of the recipient of the hearing aid, and
- detect transducer underperformance during normal use, allowing user and audiology/maintenance notifications.

During a start-up of a processing unit a self-check sequence may run. In this sequence, the performance of the vibrator is estimated via the at least one sensor element arranged on a counterweight response. During playing of a predefined signal, e.g. a start-up jingle, the response of the at least one sensor element may record and compare to a stored individual reference in the hearing aid device. For this, a simple cross correlation function can be used by the processing unit. The stored individual reference may be a time signal, frequency spectrum, or any other relevant representation of the vibrator response.

The comparison can result in various actions and suggestions. When both response representations are equal (within predefined borders) no action is taken. This could be accompanied by an informative message to the patient via an application of an external device. If the vibrator is damaged so much that the responses are not comparable anymore, must be a predefined threshold, this suggests the vibrator is collapsed or at least damaged to a degree that it is not functioning any more to support the recipient. In this case a warning will be issued via the application to inform the patient to visit the audiologist The self-check can be implemented as automatic running sequence (e.g. at start-up of the device) or it can be manually initiated by the patient via the application. Results are presented via the application and—if necessary—corrective actions are either shown (e.g. transfer function correction have been applied) or patient actions are suggested (e.g. contact your audiologist).

By means of the accelerometer hard impacts (like dropping the device) can be detected. This will trigger a suggestion sequence in the application to advice the patient when it is relevant/necessary to run a manual self-test sequence.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
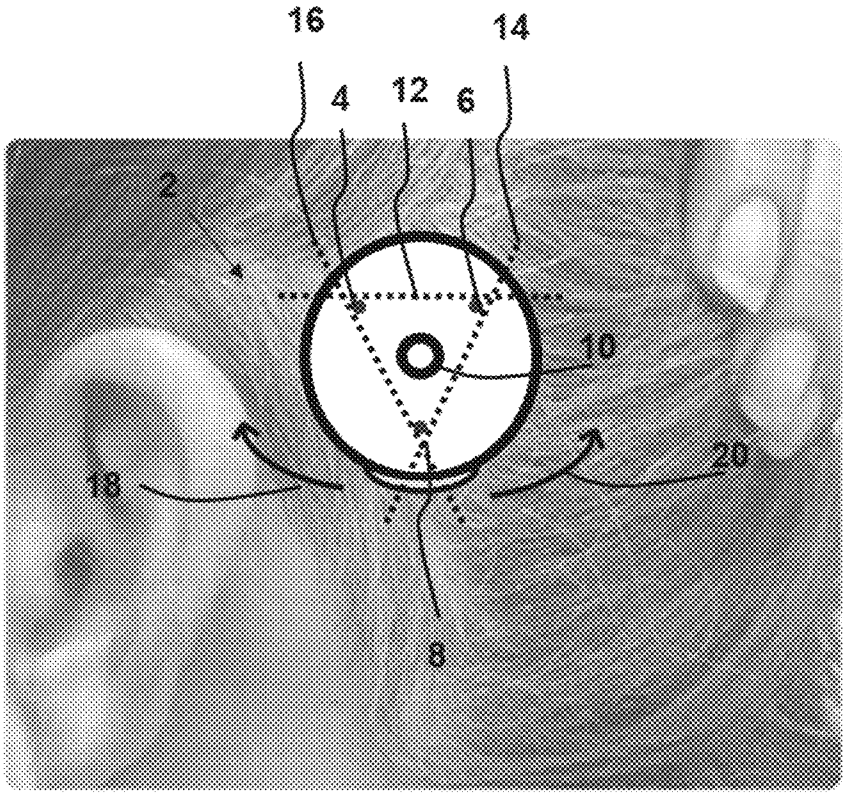
FIG. 1A schematically shows a first exemplary embodiment of a hearing aid in a first position.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. Enhancing and/or protecting the hearing capability of a user' may include compensating for an individual user's specific hearing loss.

The "hearing aid" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations or electrical vibrations, provided by for example a piezo based vibrator, to the user's inner ears through bone structure of the user's head and/or through parts of the middle ear of the user or electric signals transferred directly or indirectly to the cochlear nerve and/or to the auditory cortex of the user.

A "hearing system" refers to a system comprising one or two hearing aids, and a "binaural hearing system" or a bimodal hearing system refers to a system comprising two hearing aids where the devices are adapted to cooperatively provide audible signals to both of the user's ears either by acoustic stimulation only, acoustic and mechanical stimulation, mechanical stimulation only, acoustic and electrical stimulation, mechanical and electrical stimulation or only electrical stimulation.

The hearing system, the binaural hearing system or the bimodal hearing system may further include one or more auxiliary device(s) that communicates with at least one hearing aid, the auxiliary device affecting the operation of the hearing aids and/or benefitting from the functioning of the hearing aids. A wired or wireless communication link between the at least one hearing aid and the auxiliary device is established that allows for exchanging information (e.g. control and status signals, possibly audio signals) between the at least one hearing aid and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing aid. The remote control is adapted to control functionality and/or operation of the at least one hearing aid. The function of the remote control may be implemented in a smartphone or other (e.g. portable) electronic device, the smartphone/electronic device possibly running an application (APP) that controls functionality of the at least one hearing aid.

In general, a hearing aid includes an input unit such as at least one hearing aid microphone for receiving an acoustic signal from a user's surroundings and providing a corresponding input audio signal The hearing aid further includes a signal processing unit for processing the input audio signal and an output unit for providing an audible signal to the user in dependence on the processed audio signal.

The input unit may include at least three multiple input microphones, e.g. for providing direction-dependent audio signal processing. Such directional microphone system is adapted to (relatively) enhance a target acoustic source among a multitude of acoustic sources in the user's environment and/or to attenuate other sources (e.g. noise). In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, beamforming, noise reduction, etc. The output unit may include an output transducer such as a loudspeaker/receiver for providing an air-borne acoustic signal to the ear of the user, a mechanical stimulation applied transcutaneously or percutaneously to the skull bone, an electrical stimulation applied to auditory nerve fibers of a cochlea of the user. In some hearing aids, the output unit may include one or more output electrodes for providing the electrical stimulations such as in a Cochlear Implant, or the output unit may include one or more vibrators for providing the mechanical stimulation to the skull bone.

Now referring to FIG. 1A, which illustrates a first exemplary embodiment of a hearing aid 2 in a first position. The hearing aid 2 illustrated in the figures is a hearing aid which is magnetically attached to a fixture implanted into the skull. Such a hearing aid 2 is applied for the rehabilitation of patients suffering from hearing losses for which traditional hearing aids are insufficient.

The hearing aid 2 comprises an input unit for generating audio signals corresponding to the acoustic signals from the user's environment. The input unit comprises three microphones 4, 6 and 8, wherein the microphones 4, 6 and 8 are arranged substantially circular around a fixture interface 10 being a magnet or a mechanical fixture that is used for fixating the hearing aid 2 on the head of a user. The microphones are arranged in a trigonometry structure for the reason of improving the hearing aid's ability to determine a dynamic directionality of the audio signals in relation to a sound target and the user of the hearing aid in dependence of the position of the hearing aid on the head of the user.

The connection lines between the three microphones 4, 6 and 8 correspond to the axes of spatial distribution 12, 14 and 16. In the position of the hearing aid 2 shown in FIG. 1, the axis of spatial distribution 12 between the first hearing aid microphone 4 and the second hearing aid microphone 6 corresponds the most to a desired plane of spatial resolution for the user, e.g. to a horizontal plane. Thus, a control unit selects the audio signals of the first and the second hearing aid microphone 4, 6 and transfers the selected signals to the signal processing unit. The position, in particular the rotational position, of the hearing aid is detected by at least one sensor element (not shown).

Since the rotational position of the hearing aid 2 is not fixated due to the magnetic connection of the hearing aid via the fixture interface 10 and another implanted magnet, the hearing aid 2 may be rotated by a user or through the movement of the user along the arrows 18 and 20.

Figure 1B:
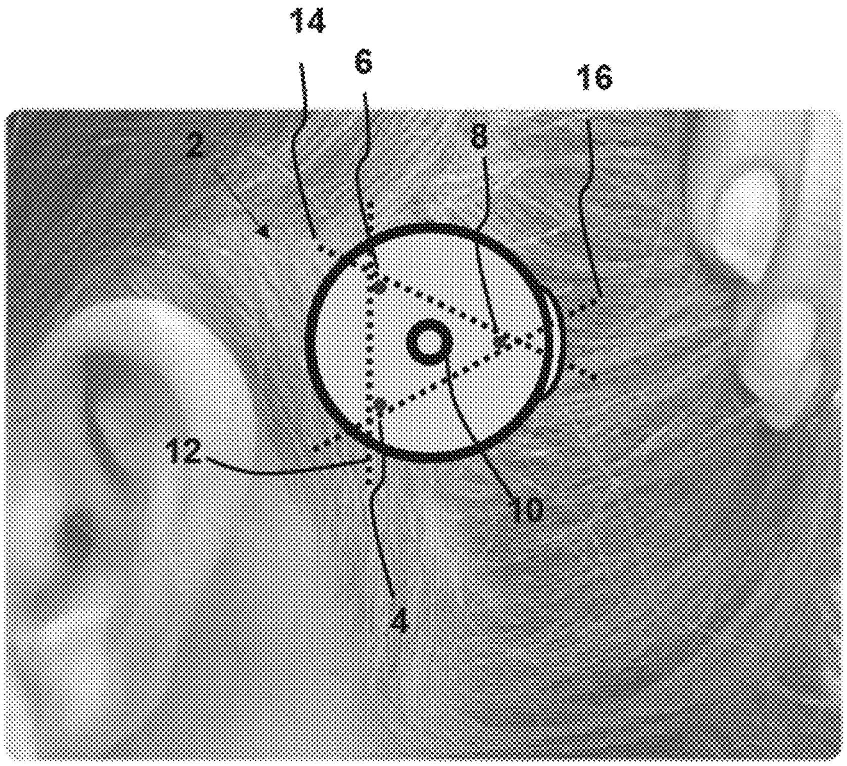
FIG. 1B schematically shows the first exemplary embodiment of a hearing aid in a second position.

FIG. 1B illustrates the first exemplary embodiment of a hearing aid 2 in a second position. The hearing aid 2 is rotated with respect to the position of the hearing aid 2 shown in FIG. 1A about approximately 90° in the direction of arrow 20 shown in FIG. 1A. Hence, the selected axis of spatial distribution 12 which was chosen due to the position of the hearing aid 2 in FIG. 1A no longer delivers audio signals which correspond to the desired spatial resolution of the user of the hearing aid 2. If the no other input of a hearing aid microphone 4, 6 and 8 would be selected, a beamforming algorithm of a signal processing unit (not shown) would modify the generated audio signals and amplify the audio signal of the hearing aid microphone 4 with regard to the hearing aid microphone 6. Such modified audio signals would then be provided to at least one of the user's ears. Thus, the sounds below the user of the hearing aid 2 would be amplified and the sound from above a user would be reduced.

Since the hearing aid 2 shown in FIG. 1B comprises at least one sensor element (not shown), which detects the position, in particular the rotational position, of the hearing 2 device, the control unit selects the audio signals of two microphones 4, 6 and 8 depending on the position of the hearing aid 2. The control unit compares the axes of spatial distribution 12, 14 and 16 defined by the connection lines between the microphones 4, 6 and 8 to the direction of desired spatial distribution or resolution of the user. The direction of desired spatial distribution or resolution for example corresponds to a substantially horizontal plane. Based on said assumption, the control unit either selects the input of the pair of microphones 4 and 8 or the pair of microphones 6 and 8. Additionally, the control unit may take the position of the microphones 4, 6 and 8 into account, thus selecting the microphones 6 and 8 since the audio signals generated by the hearing aid microphone 4 may be negatively affected by the pinna of the user.

Figure 2A:
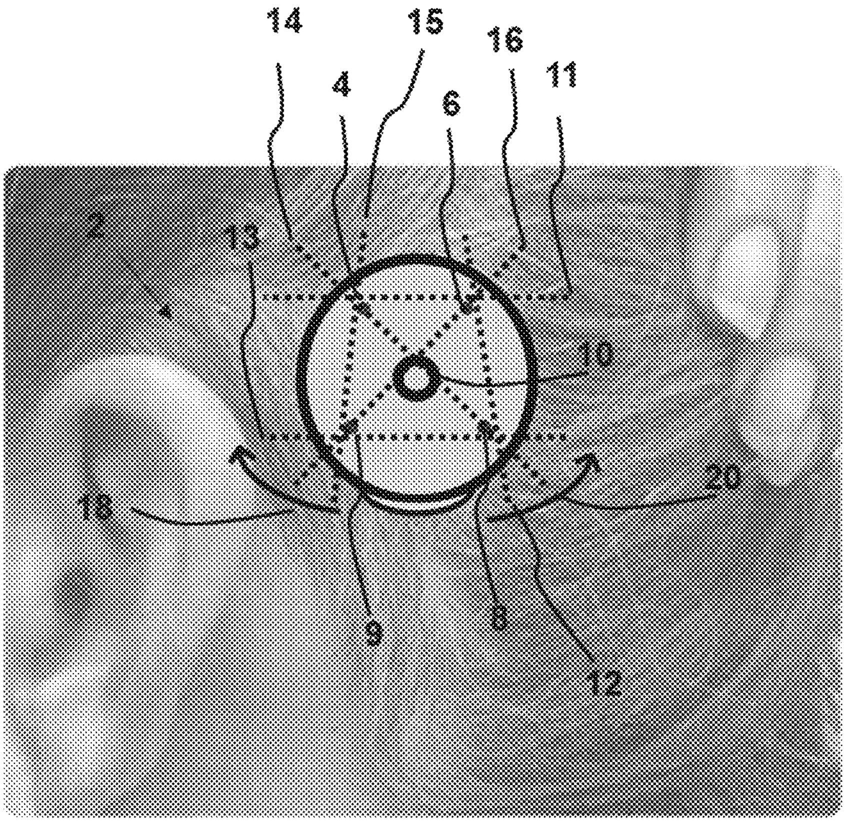
FIG. 2A schematically shows a second exemplary embodiment of a hearing aid in a first position.

FIG. 2A illustrates a second exemplary embodiment of a hearing aid 2 in a first position. In contrast to the hearing aid 2 disclosed in the FIGS. 1A and 1B, the hearing aid 2 shown in FIG. 2A comprises four microphones 4, 6, 8 and 9 arranged in a quadrant structure. Thus, the hearing aid 2 comprises six axes of spatial distribution 11, 12, 13, 14, 15 and 16 which are defined by the connection lines between the four microphones 4, 6, 8 and 9.

Since the rotational position of the hearing aid 2 is not fixed due to the magnetic connection of the hearing aid via the fixture interface 10 and an implanted magnet, the hearing aid 2 may also be rotated by a user along the arrows 18 and 20 similarly to the hearing aid 2 shown in FIGS. 1A and 1B.

Figure 2B:
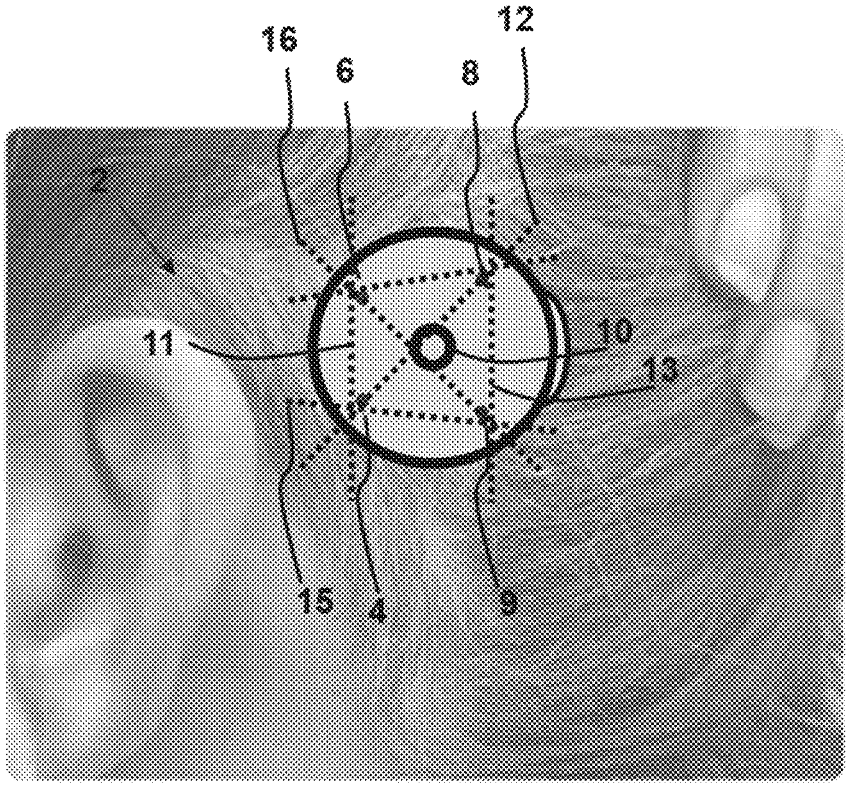
FIG. 2B schematically shows a second exemplary embodiment of a hearing aid in a second position.

FIG. 2B illustrates the second exemplary embodiment of a hearing aid 2 in a second position. The hearing aid 2 is rotated with respect to the position of the hearing aid 2 shown in FIG. 2A about approximately 90° in the direction of arrow 20. Hence, the axes of spatial distribution or resolution 11 and 13 which were beneficial with regard to the position of the hearing aid 2 in FIG. 2A no longer deliver audio signals which correspond to the desired spatial distribution or resolution of the user of the hearing aid 2.

Since the hearing aid 2 of the second exemplary embodiment also comprises at least one sensor element (not shown), which detects the position, in particular the rotational position, of the hearing 2 device, the control unit selects the audio signals of two microphones 4, 6, 8 and 9 depending on the position of the hearing aid 2. Due to four microphones 4, 6, 8 and 9, the control unit can now select between six axes of spatial distribution 11, 12, 13, 14, 15 and 16.

The control unit compares the axes of spatial distribution 11, 12, 13, 14, 15 and 16 defined by the connection lines between the microphones 4, 6, 8 and 9 to the direction of desired spatial distribution or resolution of the user. The direction of desired spatial distribution or resolution for example corresponds to a substantially horizontal plane. Based on said assumption, the control unit either selects the input of the pair of microphones 6 and 8 or the pair of microphones 4 and 9. Additionally, the control unit may take the position of the microphones 4, 6, 8 and 9 into account, thus selection the microphones 6 and 8 since the audio signals generated by the hearing aid microphone 4 and 9 may be negatively affected by the pinna of the user.

Figure 3A:
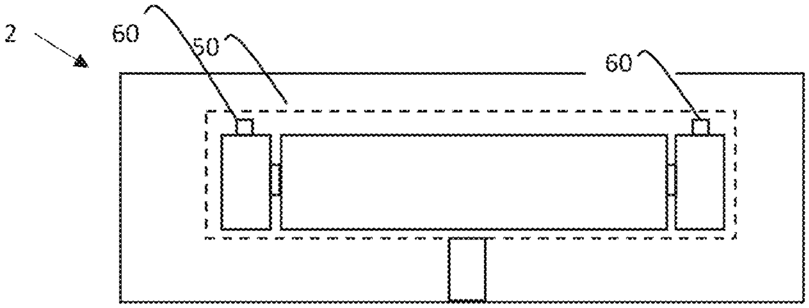
FIG. 3A schematically shows an example of a vibrator.
Figure 3B:
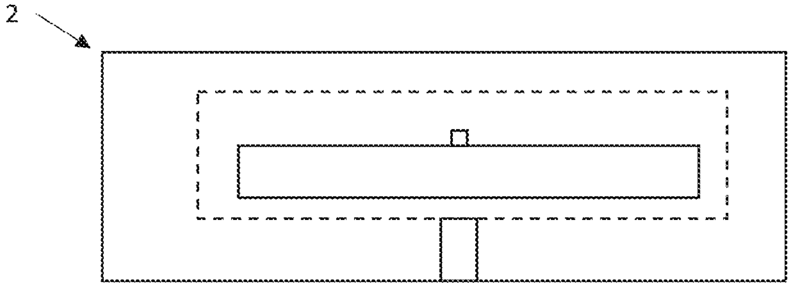
FIG. 3B schematically shows yet another example of a vibrator.

FIGS. 3A and 3B illustrates an example of a vibrator 50 of the hearing aid 2, where in FIG. 3A the at least one sensor element 60 is arranged onto a counterweight of a mechanical based vibrator 50, and in FIG. 3B the at least one sensor element 60 is arranged onto an actuator of a piezo based vibrator 50. In the specific example of the hearing aid 2 in FIG. 3A, the hearing aid 2 includes at least two sensor elements 60 that either both or one of them is configured to determine the force being applied to the fixture interface 10 or the skull of the recipient and/or determine the orientation of the at least three microphones (4, 6, 8, 9) and/or the hearing aid 2. In FIG. 3B the example is similar as in FIG. 3A, but the vibrator 50 in FIG. 3B is a piezo based vibrator 50.

Figure 4A:
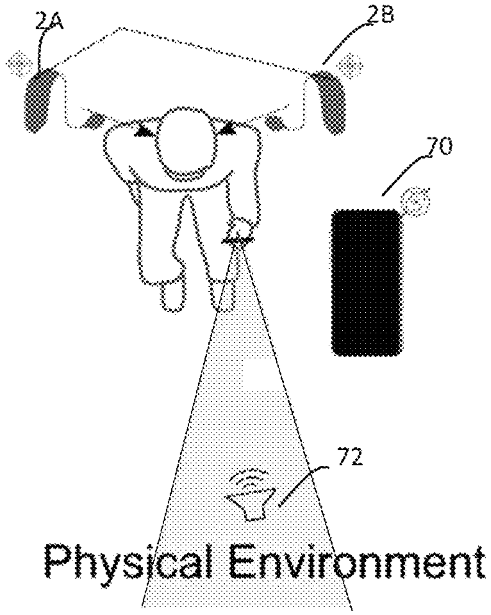
FIGS. 4A and 4B schematically show a binaural hearing aid system.
Figure 4B:
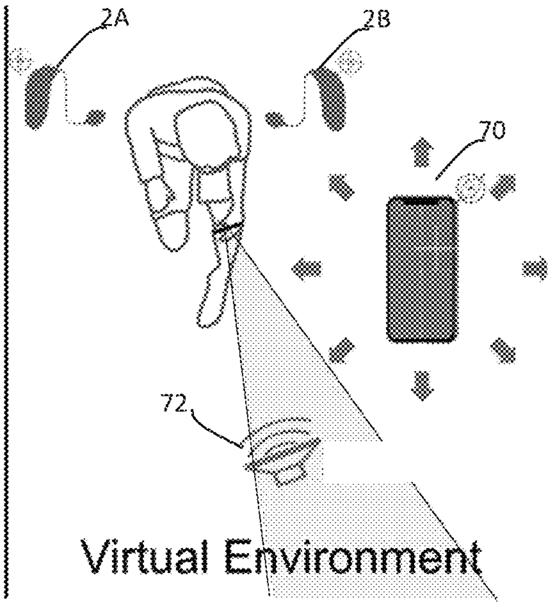

FIGS. 4A and 4B illustrate an example where the recipient of a binaural or a bimodal hearing aid system is configured to create a virtual sound environment by two hearing aids (2A,2B) and an external device 70 which in this example is a smartphone. Both hearing aids (2A,2B) include the at least one sensor element being an accelerometer 60, and the external device includes at least a gyroscope and/or an accelerometer. In FIG. 4A the recipient is being asked via an application installed on the external device 70, to point the external device 70 towards a sound source 72. The sound source 72 will then be spatialized relative to the external device 70 by the external device 70 based on information provided by the gyroscope and/or accelerometer. The two hearing aids (2A,2B) are then configured to determine based on the information provided by the at least one sensor unit element from each hearing aids (2A,2B) and information including the spatialization of the sound source 72 relative to the external device 70 a virtual position of the sound source in relation to a position of the head of the recipient. In FIG. 4B, the recipient moves around with the external device 70, the external device 70 is configured to optimize the spatialization of the sound source 72 in relation to the position of the user's head, and thereby, optimizing spatial cues of the audible signal provided to the recipient via the output unit. The optimization is either provided by the external device 70 or by both hearing aids (2A,2B). The sound source 72 may be a speaker providing an acoustical sound, or the sound source may be a streamer configured to provide an acoustical sound via a wireless communication link.

Figure 5:
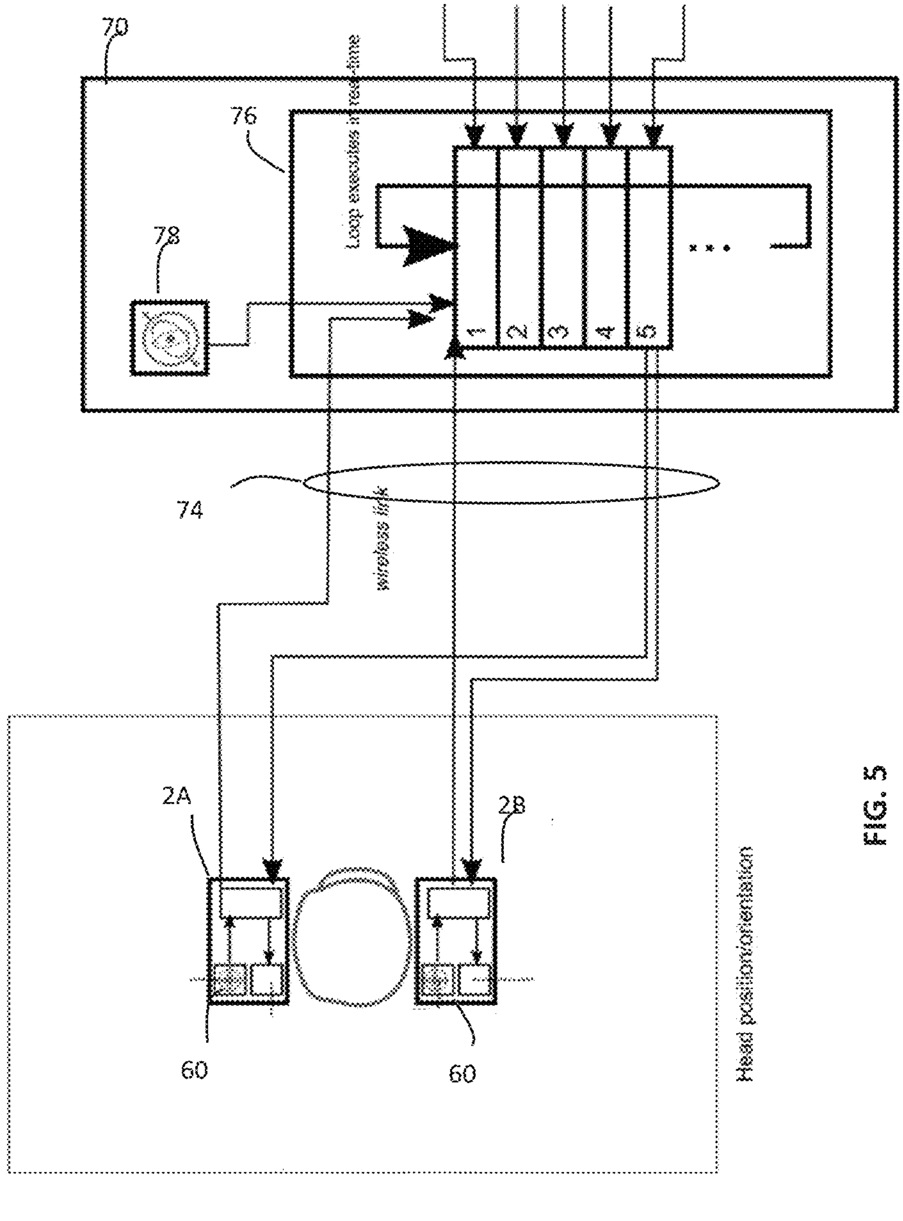
FIG. 5 shows an example of a binaural or bimodal hearing aid system.

FIG. 5 illustrates one example of the binaural or bimodal hearing aid system including the two hearing aids (2A,2B) and the external device 70. In this specific example, the hearing aids (2A,2B) transfer the information from the at least one sensor element 60 to the external device 70. The external device includes a processor 76 that receives the information from the gyroscope 78 and or the accelerometer 78 and the information from the at least one sensor element 60 of both hearing aids (2A,2B) via a wireless link 74. The processor 76 is then configured to determine head position/orientation relative to the external device 70 position orientation based on the information from the at least one sensor element 60 of both hearing aids (2A,2B), and then determine sound source 72 position or orientation relative to the external device 70 based on the information provided by the gyroscope 78 and/or the accelerometer 78. Based on the determined sound source 72 position or orientation relative to the external device 70 and the determined head position or orientation relative to the external device 70, the processor is configured to determine a virtual position or orientation of the sound source 72 relative to the head's position or orientation, and then the processor spatializes the sound source audio stream to match the position or orientation of the head relative to the virtual position or orientation. The spatialized sound stream is then streamed to the two hearing aids (2A,2B) via the wireless link 74.

It is intended that the structural features of the devices described above, either in the detailed description and/or in the claims, may be combined with steps of the method, when appropriately substituted by a corresponding process.

As used, the singular forms "a," "an." and "the" are intended to include the plural forms as well (i.e. to have the meaning "at least one"), unless expressly stated otherwise. It will be further understood that the terms "includes," "comprises," "including," and/or "comprising." when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A hearing aid for enhancing a user's hearing ability when receiving acoustic signals from the user's environment, wherein the hearing aid is arranged to be magnetically or mechanically attached to a fixture implanted in a skull bone, wherein the hearing aid comprising:

an input unit for generating audio signals corresponding to the acoustic signals from the user's environment, wherein the input unit comprises at least three microphones, in particular three to six microphones, a fixture interface configured to magnetically or mechanically attach to the fixture implanted in the skull bone, a signal processing unit for modifying the generated audio signals, an output unit to provide modified audio signals as audible signals to at least one of the user's ears, at least one sensor element for detecting an orientation of the at least three microphones relative to the fixture implanted in the skull bone, and a control unit for selecting the audio signals of at least two microphones and for transferring the selected audio signals to the signal processing unit, wherein the audio signals are selected depending on the orientation of the at least three microphones of the hearing aid.

2. The hearing aid according to claim 1, wherein the sensor element detects a position of the hearing aid by measuring a movement, an acceleration and/or an orientation of the hearing aid.

3. The hearing aid according to claim 2, wherein the sensor element is an accelerometer or a gyroscope.

4. The hearing aid according to claim 1, wherein the signal processing unit is configured to compensate for a possible dislocation of the selected microphones by modifying the audio signals on the basis of measurements made by the at least one sensor element.

5. The hearing aid according to claim 1, wherein the control unit selects the input of two microphones.

6. The hearing aid according to claim 5, wherein the control unit selects the two microphones depending on an axis of spatial distribution between the two microphones.

7. The hearing aid according to claim 1, wherein the control unit is configured to communicate the orientation via a wireless communication link of the hearing aid to an external device.

8. The hearing aid according to claim 7, wherein the control unit is configured to communicate the orientation when the determined orientation is outside a preferred orientation.

9. The hearing aid according to claim 1, wherein the control unit is configured to provide an alert signal to the output unit when the determined orientation is outside a preferred orientation, and the output unit is configured to transmit an audible signal to the user based on the alert signal.

10. The hearing aid according to claim 2, wherein the signal processing unit is configured to compensate for a possible dislocation of the selected microphones by modifying the audio signals on the basis of measurements made by the at least one sensor element.

11. The hearing aid according to claim 3, wherein the signal processing unit is configured to compensate for a possible dislocation of the selected microphones by modifying the audio signals on the basis of measurements made by the at least one sensor element.

12. The hearing aid according to claim 2, wherein the control unit selects the input of two microphones.

13. The hearing aid according to claim 3, wherein the control unit selects the input of two microphones.

14. The hearing aid according to claim 4, wherein the control unit selects the input of two microphones.

15. The hearing aid according to claim 2, wherein the control unit is configured to communicate the orientation via a wireless communication link of the hearing aid to an external device.

16. The hearing aid according to claim 3, wherein the control unit is configured to communicate the orientation via a wireless communication link of the hearing aid to an external device.

17. The hearing aid according to claim 4, wherein the control unit is configured to communicate the orientation via a wireless communication link of the hearing aid to an external device.

18. A method for enhancing a user's hearing ability when receiving acoustic signals from the user's environment, wherein a hearing aid is arranged to be magnetically or mechanically attached to a fixture implanted in a skull bone, wherein the method comprising:

generating audio signals corresponding to the acoustic signals from the user's environment by an input unit, wherein the input unit comprises at least three microphones, in particular three to six microphones;

attaching the hearing aid to the fixture magnetically or mechanically via a fixture interface;

modifying the generated audio signals by a signal processing unit;

providing the modified audio signals as audible signals to at least one of the user's ears by an output unit;

detecting an orientation of the at least three microphones in-relative to the fixture implanted in the skull bone by at least one sensor element;

selecting the audio signals of at least two microphones depending on the orientation of the at least three microphones of the hearing aid by a control unit;

transferring the selected audio signals to the processing unit.

19. The method according to claim 18, wherein the control unit selects the input of two microphones depending on axes of spatial distribution between the at least three microphones, wherein the two microphones are selected with regard to which axis of spatial distribution corresponds the most to a substantially horizontal plane and/or to a direction of desired spatial distribution of a user.

20. The method according to claim 19, wherein the control unit selects the two microphones additionally depending on a position of the two microphones, in particular depending on the position of the two microphones on the head of the user.

* * * * *